(12) United States Patent
Averdiek et al.

(10) Patent No.: US 6,491,337 B2
(45) Date of Patent: Dec. 10, 2002

(54) FLOOR TUNNEL REGION OF A VEHICLE BODYSHELL AND A TRANSVERSE BRIDGE

(75) Inventors: Reinhard Averdiek, Sindelfingen (DE); Harald Colmsee, Weil im Schönbuch (DE); Trong-Huang Duong, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/775,796

(22) Filed: Feb. 5, 2001

(65) Prior Publication Data

US 2001/0026083 A1 Oct. 4, 2001

(30) Foreign Application Priority Data

Feb. 5, 2000 (DE) .......................... 100 05 245

(51) Int. Cl.⁷ .............................. B60K 20/00
(52) U.S. Cl. ................... 296/204; 296/203.01
(58) Field of Search ........................ 296/204, 203.01, 296/188

(56) References Cited

U.S. PATENT DOCUMENTS 4,081,197 A * 3/1978 Ackel
5,988,734 A * 11/1999 Longo et al.

FOREIGN PATENT DOCUMENTS

| DE | 24 35 545 | 7/1974 |
| DE | 3831480 | 3/1990 |
| DE | 4233832 | 1/1997 |
| DE | 197 02 669 A1 | 1/1997 |

* cited by examiner

*Primary Examiner*—D. Glenn Dayoan
*Assistant Examiner*—Scott Carpenter
(74) *Attorney, Agent, or Firm*—Crowell & Moring LLP

(57) ABSTRACT

Tunnel region of a floor structure of a bodyshell f a motor vehicle and a transverse bridge. A tunnel region of a floor structure with a transverse bridge for reinforcing the tunnel region, which is held on the tunnel region by brackets fixed on side walls of the tunnel region. The side walls of the tunnel region are aligned vertically in the region in which the brackets are attached, and the brackets are positioned at the same height on the side walls.

13 Claims, 2 Drawing Sheets

FLOOR TUNNEL REGION OF A VEHICLE BODYSHELL AND A TRANSVERSE BRIDGE

BACKGROUND AND SUMMARY OF THE INVENTION

This application claims the priority of German Application No. DE 100 05 245.2, filed in Germany on Feb. 5, 2000, the disclosure of which is expressly incorporated by reference herein.

The invention relates to a tunnel region of a floor structure of a bodyshell of a motor vehicle with a transverse bridge for reinforcing the tunnel region, which is held by brackets fixed on side walls of the tunnel region and to a transverse bridge for this purpose. The side walls are designed to extend obliquely outwards in an adjoining supporting region below the brackets.

It is well-known in the case of passenger cars to close off the downwardly open tunnel profile of a tunnel region of a floor structure of a bodyshell of the passenger car at the level of the passenger compartment with a flat transverse bridge in order to reinforce the floor structure, a corresponding part of an exhaust system being positioned on the underside of this transverse bridge. The transverse bridge is screwed to two brackets, which are fixed on obliquely extending side walls of the tunnel region by welding. A gear-change mechanism is furthermore accommodated on the tunnel region, above the transverse bridge, this mechanism being positioned at a suitable point on the tunnel profile.

Another known practice from German Patent Documents DE 24 35 545 B2 or DE 197 02 669 A1 for holding the vehicle gearbox in the front area of the passenger compartment is to assign to the tunnel region a gearbox bridge, which carries the vehicle gearbox and bridges the tunnel profile of the tunnel region.

An object of the invention is to provide a tunnel region of the type stated at the outset which has a transverse bridge that can perform additional functions apart from that of transverse reinforcement.

This object is achieved, according to preferred embodiments of the invention, in that the side walls are aligned vertically, parallel to one another, in the region in which the brackets are attached, in that the brackets are fixed opposite one another on the side walls, at the same height relative to an upper side of the tunnel region, and that the transverse bridge is connected to the brackets at at least two fixing points, in particular in a removable manner.

The preferred embodiments according to the invention ensure that the transverse bridge is positioned below the upper side of the tunnel region at a distance which is accurate and uniform across its width. It is preferably aligned in an exactly horizontal manner. In the prior art, in contrast, the attachment of the brackets to the side walls of the tunnel region was subject to tolerances, making it impossible to achieve accurate predeterminable positioning of the transverse bridge relative to the upper side of the tunnel region. On the contrary, the position of the transverse bridge varied on different vehicles in a series depending on the respective tolerances of the floor structures of the tunnel region at the bodyshell stage.

The preferred embodiment according to the invention and the accurate, properly adjusted positioning of the transverse bridge relative to the upper side of the tunnel region makes it possible to confer additional functions on the transverse bridge. It is particularly advantageous here to involve the transverse bridge in accepting a gear-change mechanism. In contrast to the prior art, in which the corresponding gear-lever arrangement of the gear-change mechanism was provided on the upper side of the tunnel region, it is now possible to recess corresponding parts of the gear-change mechanism directly into the tunnel region and to use the transverse bridge to hold corresponding parts of the gear-change mechanism. The preferred embodiments according to the invention, which allow almost tolerance-free installation of the transverse bridge, create the conditions for such an additional function of the transverse bridge.

In a preferred embodiment of the invention, the transverse bridge is fixed on the brackets from below. In this case, particularly simple installation of the transverse bridge on the welded-in brackets can be achieved. This is advantageous particularly if the transverse bridge is connected removably to the brackets since, in this case, the transverse bridge can be removed again from below in a simple manner.

In another preferred embodiment of the invention, the transverse bridge has supporting extensions that extend obliquely downwards and outwards on opposite sides. These ensure the desired transverse supporting function and rigidity for raising the floor structure in a corresponding side impact. The transverse bridge and, in particular, its supporting extensions are preferably positioned in such a way at the level of floor members, each adjoining laterally at the outside, that force can be transmitted directly between the floor crossmembers and the transverse bridge, including the supporting extensions of the latter. The essential point here is that, in their obliquely outward- and downward-extending form, the supporting extensions are matched in such a way to the corresponding configuration of the side walls of the tunnel region at the level of these supporting extensions that the supporting extensions extend essentially parallel to these side wall portions and rest at least approximately directly on these side wall portions. This ensures that, in a corresponding side impact, the corresponding side wall of the tunnel region comes to rest at least virtually without deformation directly on the associated supporting extension of the transverse bridge, thus ensuring that the corresponding impact forces are directed into the transverse bridge and are transmitted into the opposite side wall of the tunnel region via the opposite supporting extension and directly onwards into the adjoining floor crossmember.

In another preferred embodiment of the invention, the transverse bridge has a downwardly open U-type profile. This ensures high rigidity combined with a relatively low weight of the transverse bridge.

In another preferred embodiment of the invention, the transverse bridge has a central part, to which the supporting extensions are joined as separate components. This makes the transverse bridge simpler to manufacture. It is particularly advantageous if the supporting extensions are connected to the central part by means of a cohesive joining method, in particular by laser welding. This results in a very accurate and high-quality connection between the supporting extensions and the central part.

In another preferred embodiment of the invention, the transverse bridge is provided with receptacles and/or fixing means for holding a gear-change mechanism. This allows corresponding parts of the gear-change mechanism to be attached to the transverse bridge in a particularly simple and reliable manner. It is advantageously even possible to preassemble the gear-change elements on the transverse bridge and to insert the preassembled unit into the tunnel region and connect it to the brackets.

Other objects, advantages and novel features of the present invention will become apparent from the following detailed description of the invention when considered in conjunction with the accompanying drawings.

DETAILED DESCRIPTION OF THE DRAWINGS

Figure 1:
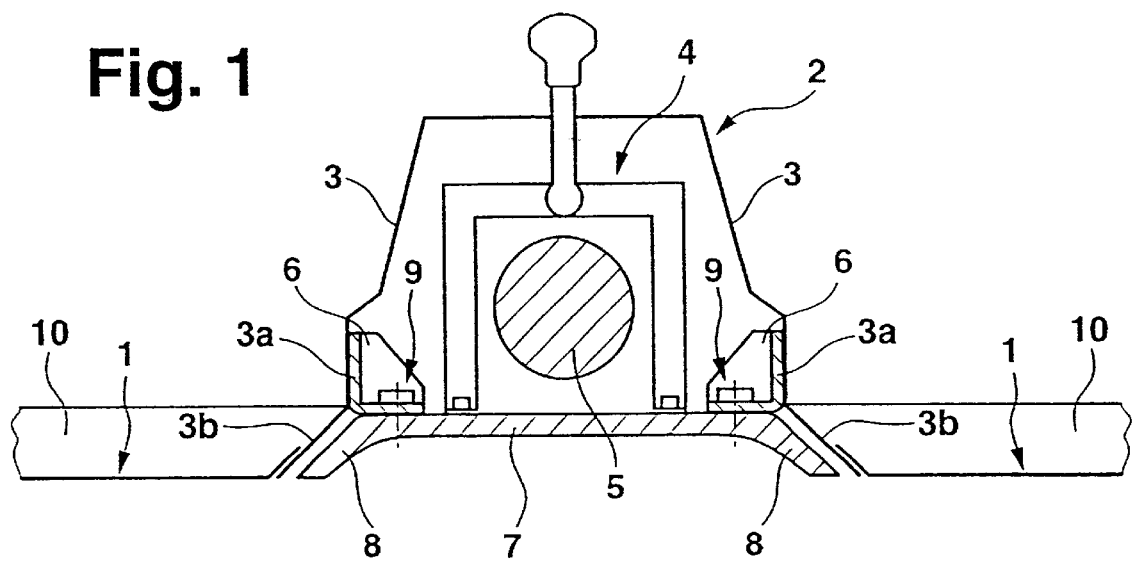
FIG. 1 shows a cross section of a tunnel region schematically.
Figure 2:
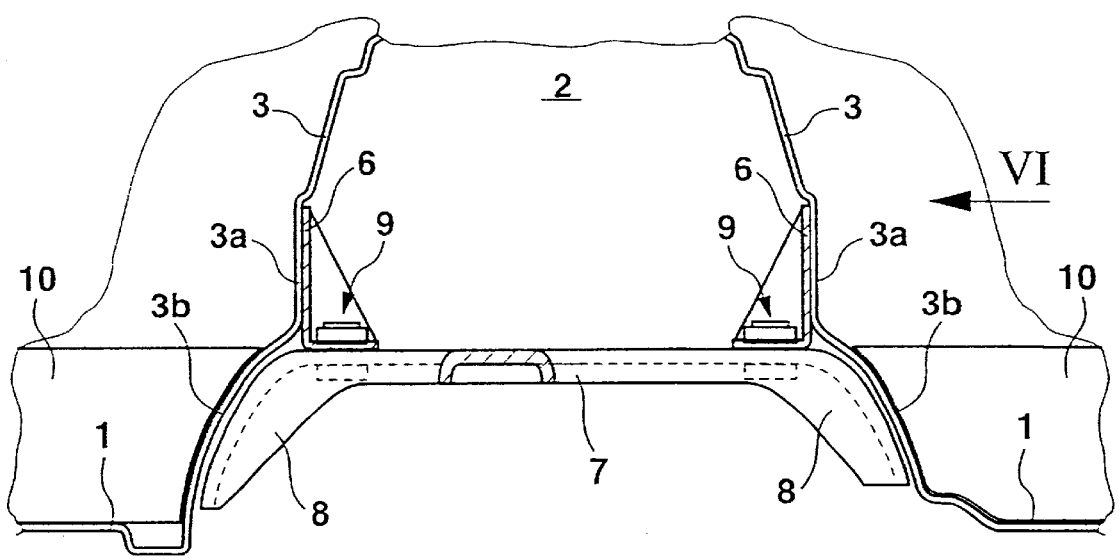
FIG. 2 is a cross section through a preferred embodiment of a tunnel region similar to that in FIG. 1 on an enlarged scale.

A floor structure 1 in accordance with FIG. 1 or 2 is part of a self-supporting bodyshell of a passenger car and, in the region of a passenger compartment, has a tunnel region 2, which extends in the longitudinal direction of the vehicle and, in cross section, is configured as a downwardly open U-type profile. As seen in the direction of travel, the tunnel region 2 illustrated in FIGS. 1 and 2 is provided behind a transmission block and is situated at the level of a gear-change mechanism 4. An articulated shaft 5 extends in the tunnel region 2.

The tunnel region 2 has two side walls 3, which merge into horizontal floor portions of the floor structure 1 in the transverse direction of the vehicle. The side walls 3 each have at the same height a vertical wall portion 3a, which forms an adjustment surface and to each of which a bracket 6 for fixing a transverse bridge 7, 8 is firmly welded. In this arrangement, the two brackets 6 are aligned on these vertical wall portions 3a with such accuracy relative to one another and to a horizontal plane or to an upper side of the tunnel region that the brackets 6 are positioned at the same height relative to one another and over the same length, as seen in the longitudinal direction of the vehicle. Below the wall portions 3a, each side wall 3 has two wall portions that extend obliquely outwards and downwards and form supporting portions 3b for the transverse bridge 7, 8. These supporting portions 3b merge into the horizontal floor areas of the floor structure 1. The brackets 6 shown in FIGS. 1 and 2 are designed as sturdy flanged angle brackets, which are provided with lateral reinforcing flanges. Adjoining each of the side walls 3 on the outside at the level of these supporting portions are two floor crossmembers 10, which extend outwards as far as a sill region and are positioned below the front seats.

A transverse bridge 7, 8 is joined to the underside of each bracket 6 and screwed to the respective bracket 6 in the region of a respective holding point 9. The transverse bridge 7 has a downwardly open U-type profile extending in the transverse direction of the vehicle, as can be seen from FIG. 2. The transverse bridge 7, 8 is provided with a horizontal central part 7, on which the screwed fasteners for fixing the transverse bridge 7, 8 on the brackets 6 engage. Adjoining the central part 7 on each side—as seen in the transverse direction of the vehicle—is a respective supporting extension 8, which extends obliquely outwards and downwards from the holding points 9. Each supporting extension 8 is aligned approximately parallel to the respective supporting portion 3b of the associated side wall of the tunnel region 2, each supporting extension 8 being at a distance from the associated supporting portion 3b of the tunnel region 2. The central part 7 is provided with receptacles for fixing the gear-change mechanism 4. Due to the accurate adjustment and alignment of the brackets 6, the transverse bridge is also aligned accurately relative to the upper side of the tunnel, allowing the gear-change mechanism to be positioned accurately on the transverse bridge. Tolerance-related inaccuracies in the installation of the gear-change mechanism are thus avoided.

Figure 3:
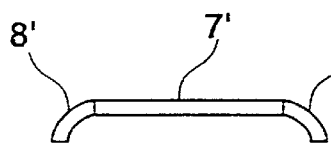
FIG. 3 shows a transverse bridge for a tunnel region in accordance with FIG. 1 or 2.
Figure 4:
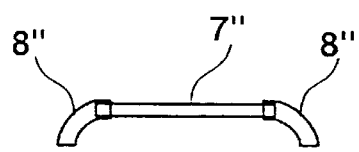
FIG. 4 shows another preferred embodiment of a transverse bridge for a tunnel region in accordance with FIG. 1 or 2 in a slightly modified form.

The transverse bridges 7', 8'; 7", 8" shown in FIGS. 3 and 4 correspond essentially to the transverse bridge described above with reference to FIGS. 1 and 2, the transverse bridges 7', 8'; 7", 8" shown in FIGS. 3 and 4 each being of three-part design in contrast to the transverse bridge shown in FIGS. 1 and 2, which is manufactured in one piece. Respective supporting extensions 8', 8" designed as separate components are joined to a central part 7' on opposite sides. In the case of the exemplary embodiment shown in FIG. 3, joining is performed by laser welding. The supporting extensions 8' are butt-jointed to the lateral edges of the central part 7'. In the case of the exemplary embodiment shown in FIG. 4, the connection is made by arranging the supporting extensions 8" on the central part 7", in such a way that they overlap in the transverse direction of the vehicle and connecting them in a corresponding manner by spot welding.

Figure 5:
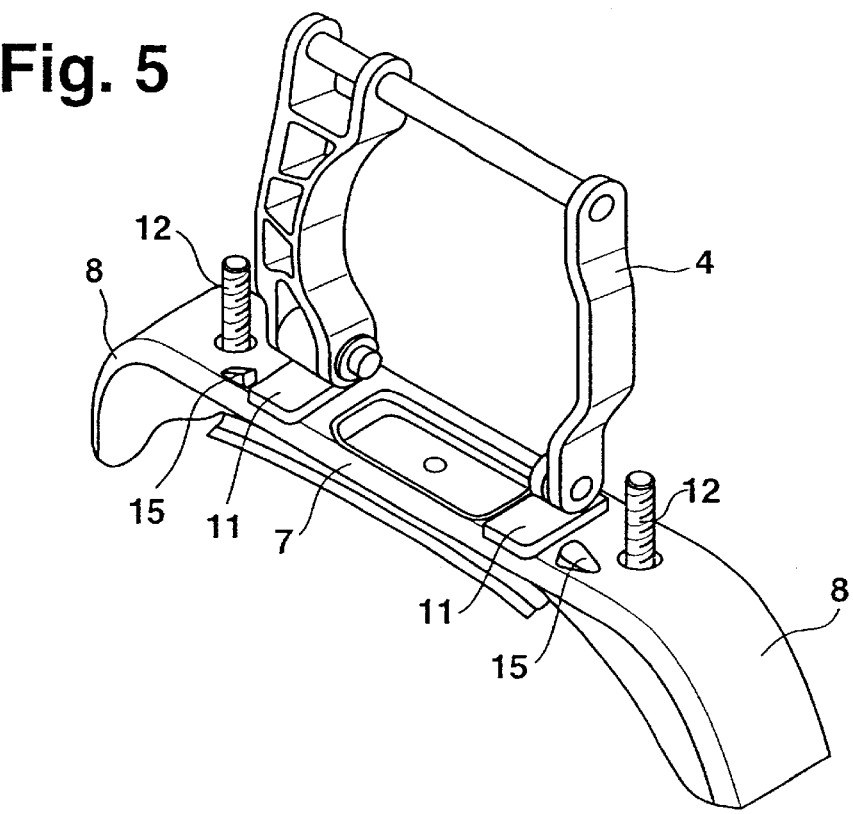
FIG. 5 shows an embodiment of a transverse bridge in perspective representation.

The transverse bridge 7, 8 shown in FIG. 5 is provided as a one-piece sheet-metal part with a transversely extending central part 7 and supporting extensions 8 that are offset laterally downwards. Reinforcing flanges are provided along the longitudinal sides of each of the supporting extensions 8 in order to avoid deformation of the transverse bridge 7, 8 in a corresponding side impact. The central part 7 of the transverse bridge 7, 8 is provided with receiving portions 11, by which corresponding hoop and lever arrangements of the gear-change mechanism 4 are secured on the transverse bridge 7, 8. Two bolts 12 furthermore project upwards through two circular apertures in the transverse bridge 7, 8. These bolts are used to fix the transverse bridge 7, 8 removably on the brackets 6. It is possible here either for the bolts 12 to be screwed from the underside, by corresponding screw heads, into corresponding threaded nuts welded firmly to the brackets 6 or for the bolts 12 to be connected rigidly to the transverse bridge 7, 8 and for the threaded nuts to be screwed onto these bolts 12 from the upper side of the brackets 6.

Figure 6:
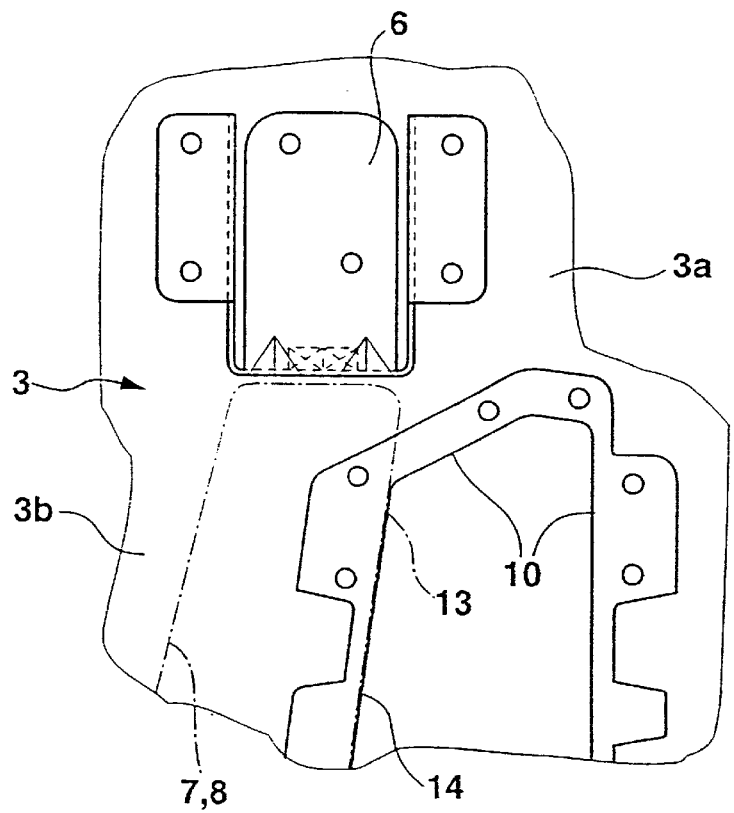
FIG. 6 is a side view of the tunnel region in accordance with FIG. 1 at the level of attachment of a floor crossmember in the direction of arrow VI in FIG. 2.

The position of the transverse bridge 7, 8 relative to a bracket 6 on the driver's side and a floor crossmember 10, also on the driver's side, as viewed in the transverse direction of the vehicle, is illustrated in FIG. 6. Here, it can be seen that, on the hand, the bracket 6 is welded firmly to the corresponding side wall 3 of the tunnel region in the region of the side-wall portion 3a by corresponding spot welds and that, on the other hand, on the outside, the floor crossmember 10 rests against the lower side-wall portion 3d by corresponding welding flanges and is welded to the side wall 3 by suitable spot welds. The chain-dotted illustration in FIG. 6 represents the side view of the transverse bridge 7, 8 shown in FIG. 5. It can be seen here that the transverse bridge 7, 8 in this side view is of asymmetric design, with the supporting projections 8 being aligned in a slightly oblique manner. The reinforcing flanges, in particular, which form the front and rear contours, are aligned obliquely. The reinforcing flange 13 of the transverse bridge 7, 8 which is at the rear in the normal direction of travel extends almost exactly in alignment with a front side wall 14 of the floor crossmember 10 which is on the left as seen in the direction of travel, these mutually aligned wall portions ensuring that forces are transmitted reliably and in a plane extending in the transverse direction of the vehicle.

Since the transverse bridge 7, 8 is not of symmetrical design, it is important that the transverse bridge 7, 8 be installed in the correct position in order to ensure an adequate transverse reinforcing function. To ensure that the transverse bridge 7, 8 can only be installed in the position illustrated in FIG. 6, in which the rear reinforcing flange 13 is aligned parallel and/or in alignment with the front side wall of the respective floor crossmember 10, coding features in the form of profiles 15 are provided in the region of the central part 7 of the transverse bridge 7, 8, these profiles being designed as hump-like embossed elements in the embodiment shown in FIG. 5. Corresponding profiles are provided on the bracket 6, these being designed in an appropriately reversed manner as corresponding recesses. The hump-shaped embossed elements can enter these recesses in a form-locking manner if the transverse bridge 7, 8 is installed in the correct position. If the transverse bridge 7, 8 is installed in a position rotated through 180°, secure fixing is not possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Tunnel region of a floor structure of a bodyshell of a motor vehicle with a transverse bridge for reinforcing the tunnel region, which is held by brackets fixed on side walls of the tunnel region, the side walls of the tunnel region being designed to extend obliquely outwards on both sides in an adjoining supporting region below the brackets, wherein the side walls are aligned vertically, parallel to one another, in a region where the brackets are attached, the brackets are aligned and fixed opposite one another on the side walls, at the same height relative to an upper side of the tunnel region, and wherein the transverse bridge has supporting extensions extending obliquely downward and outward on opposite sides, said extensions being matched to a shape of the side walls of the tunnel region in order to accurately align the transverse bridge below the tunnel region, and the transverse bridge is connected to the brackets at at least two fixing points.

2. Tunnel region according to claim 1, wherein the transverse bridge is fixed on the brackets from below.

3. Tunnel region according to claim 1, wherein the transverse bridge has a downwardly open U-type profile.

4. Tunnel region according to claim 1, wherein the transverse bridge has a central part to which supporting extensions are joined as separate components.

5. Tunnel region according to claim 4, wherein the supporting extensions are connected to the central part by a cohesive joining method.

6. Tunnel region according to claim 1, wherein the transverse bridge is provided with fixing means for holding a gear-change mechanism.

7. Method of making a tunnel region of a floor structure of a motor vehicle with side walls being designed to extend obliquely outward on both sides in an adjoining supporting region,comprising the steps of:

aligning and attaching brackets- opposite one another on the side walls at the same height relative to an upper side of the tunnel region and above the adjoining supporting region, and connecting a transverse bridge for reinforcing the tunnel region at at least two fixing points in a removable manner, wherein the side walls are aligned vertically parallel to one another in a region where the brackets are attached in order to accurately align the transverse bridge below the tunnel region, and wherein the transverse bridge has supporting extensions extending obliquely downward and outward on opposite sides, said extensions being matched to a shape of the side walls of the tunnel region in order to accurately align the transverse bridge below the tunnel region.

8. A transverse bridge assembly for reinforcing a floor structure tunnel region of a motor vehicle, comprising:

brackets being fixed on side walls of the tunnel region, and a transverse bridge being connected to the brackets at at least two fixing points in a removable manner in order to accurately align the transverse bridge below the tunnel region, wherein a vertical section, which is attached to the side walls, of each of the brackets, is aligned vertically parallel to one another, and the brackets are fixed opposite one another on the side walls at the same height relative to an upper side of the tunnel region, and wherein the transverse bridge has supporting extensions extending obliquely downward and outward on opposite sides, said extensions being matched to a shape of the side walls of the tunnel region.

9. A transverse bridge assembly according to claim 8, wherein the transverse bridge is fixed on the brackets from below.

10. A transverse bridge assembly according to claim 8, wherein the transverse bridge has a downwardly open U-type profile.

11. A transverse bridge assembly according to claim 8, wherein the transverse bridge has a central part to which supporting extensions are joined as separate components.

12. A transverse bridge assembly according to claim 8, wherein the supporting extensions are connected to the central part by a cohesive joining method.

13. A transverse bridge assembly according to claim 8, wherein the transverse bridge is provided with fixing means for holding a gear-change mechanism.

* * * * *